(12) United States Patent
Chung et al.

(10) Patent No.: US 10,863,469 B2
(45) Date of Patent: Dec. 8, 2020

(54) SYSTEM AND METHOD FOR ACCURATE TIMESTAMPING OF VIRTUAL REALITY CONTROLLER DATA

(71) Applicant: Google LLC, Mountain View, CA (US)

(72) Inventors: Sherk Chung, Piedmont, CA (US); Ian Atkinson, Castro Valley, CA (US); Advait Jain, Santa Clara, CA (US); Lucine Oganesian, Mountain View, CA (US); Murphy Stein, San Jose, CA (US); Saket Patkar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 15/840,158

(22) Filed: Dec. 13, 2017

(65) Prior Publication Data

US 2019/0110264 A1    Apr. 11, 2019

Related U.S. Application Data

(60) Provisional application No. 62/571,041, filed on Oct. 11, 2017.

(51) Int. Cl.
*H04W 56/00* (2009.01)
*H04W 4/70* (2018.01)
*H04W 4/38* (2018.01)
*H04W 84/20* (2009.01)

(52) U.S. Cl.
CPC ........... *H04W 56/002* (2013.01); *H04W 4/38* (2018.02); *H04W 4/70* (2018.02); *H04W 84/20* (2013.01)

(58) Field of Classification Search
None
See application file for complete search history.

(56) References Cited

U.S. PATENT DOCUMENTS

| | | | |
|---|---|---|---|
| 9,548,832 B1 | 1/2017 | Cho et al. | |
| 9,584,302 B2 | 2/2017 | Karthik et al. | |
| 2011/0075685 A1* | 3/2011 | Xu | H04L 27/2672 370/503 |
| 2012/0311136 A1* | 12/2012 | Shafi | G06F 1/14 709/224 |
| 2014/0143582 A1* | 5/2014 | Kindred | H04R 25/554 713/400 |
| 2016/0352388 A1* | 12/2016 | Lane | H04L 7/08 |
| 2018/0196465 A1* | 7/2018 | Sharpe-Geisler | G06F 1/14 |
| 2018/0203034 A1* | 7/2018 | Yamashita | G01B 11/00 |

FOREIGN PATENT DOCUMENTS

WO    2016139576 A2    9/2016

* cited by examiner

*Primary Examiner* — Adnan Baig

(57) ABSTRACT

Systems, devices, and methods synchronize sensor data and timestamps based on a second clock of a second device relative to a first clock of a first device. The data are communicated from the second device to the first device by way of respective wireless circuits in the first and second devices. Timestamps based on the second clock are corrected based on one or more of a time offset value and a clock frequency offset value of the second clock relative to the first clock. The timestamps for the sensor data are scaled to account for clock drift, and shifted to account for clock offset error.

23 Claims, 5 Drawing Sheets

SYSTEM AND METHOD FOR ACCURATE TIMESTAMPING OF VIRTUAL REALITY CONTROLLER DATA

BACKGROUND

Field of the Disclosure

The present disclosure relates generally to accurate timestamping of sensor readings from a wireless virtual reality peripheral device.

Description of the Related Art

It is often desirable for a device to capture accurate readings from a sensor for accurate tracking of "pose" (which may be the position, the orientation, or the combination of position and orientation), especially in relation to wireless handheld devices such as virtual reality (VR) controllers. Data from sensors are used in an algorithm to compute the pose of the device relative to a known base or reference. In many cases, the sensor data from a controller is combined with sensor data from a VR headset to improve the performance of controller pose calculations. In such cases, it is desirable to know at what time the controller sensor data were captured relative to the time the headset sensor data were captured, since combining data with inaccurate relative timestamps can increase pose error.

Additionally, since some computations require accurate measurements of elapsed time, in many cases the accuracy of the timestamps are just as important as the accuracy of the values of the sensor reading. For example, when using inertial measurement unit (IMU) data to compute distance, acceleration sensor readings from the IMU are multiplied by a delta-time to get velocity, and these readings are multiplied again by delta-time to get distance. Accordingly, any error in the delta-time variable is squared, which can create large inaccuracies in distance computations.

It is possible to employ protocols such as the network timing protocol (NTP) to try to keep a VR controller clock synchronized to a headset clock so that all sensor measurements are timestamped relative to a same time base. However, NTP and NTP-like protocols on top of wireless protocols like Bluetooth™ and WiFi™ only provide accuracy on the order of milliseconds, since they rely on sending application-level messages with time references but do not accurately account for variable delays necessary to deliver those messages. Accuracy of timestamps within a few milliseconds is not sufficient for combining data from various components in some electronic systems including some VR systems. Accordingly, there is an opportunity for better than millisecond timestamp accuracy in VR and other types of systems that require tightly synchronized data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Described herein are various embodiments of systems, devices, and methods for improving timestamp accuracy where timestamps are associated with respective sensor data taken at a second device relative to a first device's clock. There are multiple ways to use a wireless protocol to achieve more accurate time synchronization. Two types of corrections may be implemented to improve the synchronization accuracy: a clock frequency correction and a clock offset correction. A clock frequency mismatch is sometimes known as clock drift where a first clock frequency drifts relative to a second clock frequency.

In one illustrative scenario, a system employs a wireless radio protocol ("wireless protocol") to communicate wirelessly between a master device and a slave device where the wireless protocol requires the master device and the slave device to keep their respective clocks synchronized with each other. As described further herein, according to some embodiments, a clock rate synchronization is implemented between two or more devices sharing sensor data by use of wireless circuits such as radio circuits in the devices. According to other described embodiments, the devices use other than radio circuits to improve the synchronization of slave sensor data with the master device's clock. Yet further described embodiments use timed events to improve the synchronization of slave sensor data where the timestamps of the slave sensor data are initially based on the slave device's clock.

By way of example, some techniques for improved time synchronization operate at low levels of a wireless protocol stack and can be used to keep time synchronized between a virtual reality (VR) controller and a VR headset. In one embodiment, a WiFi time synchronization mechanism can be modified and used to keep a time reference of the VR controller synchronized to the VR headset for improved user experience. A VR controller may be configured to generate a pose of the VR controller relative to the VR headset, where a "pose" is defined as an orientation, a position, or a combined position and orientation. Such generation is based on VR controller sensor data and corresponding synchronized timestamps.

Figure 1:
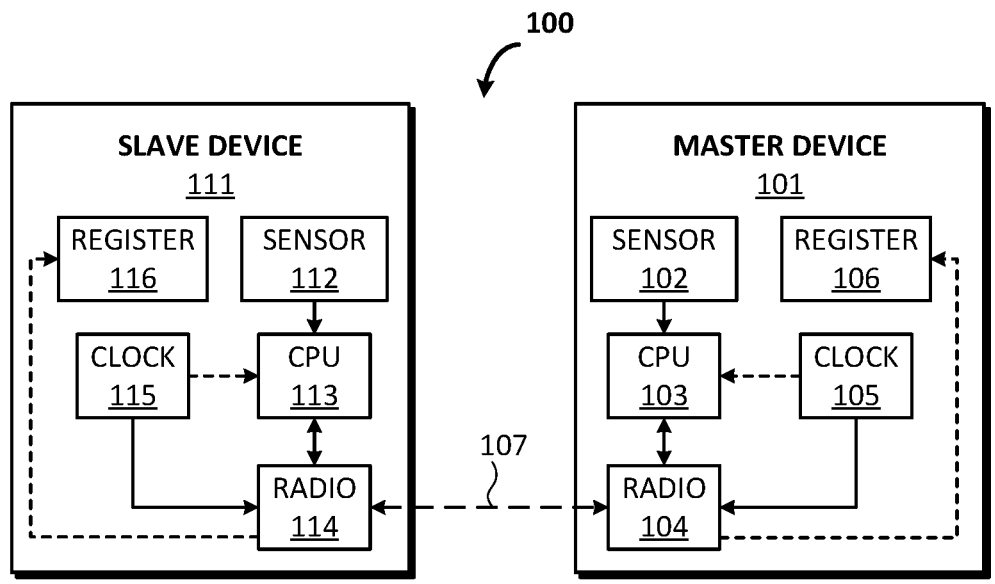
FIG. 1 is a block diagram of a system for improved time synchronization of sensor data in accordance with some embodiments.

FIG. 1 is a block diagram of a system for improved time synchronization of sensor data in accordance with some embodiments. A clock rate synchronization is implemented between a master device and a slave device. In FIG. 1, a clock frequency correction improves the time synchronization. As used herein, a master device is either a first device or a second device, and a slave device is correspondingly either a second device or a first device. Reference may be made to either a master/slave device relationship or to a first/second device relationship without departing from the principles associated with the various embodiments.

In FIG. 1, a system 100 includes a master device 101 that communicates with a slave device 111. The master device 101 includes a processor such as central processing unit (CPU) 103, a radio 104 such as a radio circuit, and a master clock 105. The radio 104 is an example of a first wireless circuit in the master device 101. One or more of the various components of the master device 101 base their operation on the master clock 105 as indicated by the arrows. For example, the CPU 103 and the radio 104 are based on the master clock 105. The master device 101 may include a sensor 102 and the sensor 102 may generate data for the system 100 but in some embodiments such data generation is not related to the time synchronization between the master device 101 and the slave device 111.

The slave device 111 includes a sensor 112, a processor such as CPU 113, a radio 114 such as a radio circuit, and a slave clock 115. The radio 114 is an example of a second wireless circuit in the slave device 111 that communicates with the first radio 104 in the master device 101. One or more of the various components of the slave device 111 base their operation on the slave clock 115 as indicated by the arrows. For example, operation of the radio 114 is based on the slave clock 115. The radio 104 of the master device 101 communicates according to a physical layer protocol 107 with the radio 114 of the slave device 111.

According to one embodiment, a clock rate synchronization is implemented between the first radio 104 and the second radio 114. The first radio 104 maintains a clock frequency offset (a value that represents the difference in frequencies between two clocks) for the radio clocks in a first register 106 of the master device 101. According to some embodiments, the first register 106 is in a memory structure forming part of the CPU 103, a memory structure forming part of or accessible by the radio 104, a memory structure accessible by the clock 105, or a general purpose memory of the master device 101 that is available to the components of the master device 101.

According to another embodiment, the second radio 114 maintains the clock frequency offset in a second register 116 of the slave device 111. According to yet another embodiment, the first radio 104 maintains the clock frequency offset in the first register 106 and the second radio 114 also maintains the clock frequency offset in the second register 116. The clock frequency offset allows the radios 104, 114 of the master device 101 and the slave device 111 to remain sufficiently synchronized to be able to exchange data. The clock frequency offset may be updated as often as necessary and may be done during a connection interval. The clock frequency offset may be in the form of a percentage or fraction of a first frequency to a second frequency or some other number or string convertible to a number.

In an embodiment where the master device 101 gathers data from the sensor 112 of the slave device 111, and where timestamps are based on the clock 115 of the slave device 111, the master device 101 reads the clock frequency offset from the first register 106 or receives the clock frequency offset from the second register 116 via a communication from the second radio 114 to the first radio 104. The master device 101 then scales slave device clock readings—timestamps associated with one or more of the sensor data—by an appropriate amount to keep the timestamps from the slave device 111 in sync with timestamps or time derived from the master device clock 105. For example, if the clock frequency offset from the register 116 shows that the slave clock 115 advances 1.112% faster than the master clock 105, timestamps based on the slave clock 115 are scaled by the 1.112% in order for the timestamps of the slave device 111 to better reflect what the timestamps would have been, had the sensor readings of the slave device 111 been taken using the master's clock 105. Thus, data captured by the sensor 112 of the slave device 111 are more accurately time-synchronized with data captured by the sensor 102 of the master device 101. Such synchronization keeps timestamps based on the master and slave clocks 105, 115 from drifting apart, but it does not correct for potential offsets between the clocks that were present at the time synchronization began. A separate time offset can correct for data collected at different start times on respective master and slave devices 101, 111.

As another example for the devices 101, 111 of FIG. 1, the physical layer protocol 107 is the Bluetooth (BT) protocol. A current version of the BT protocol specifies connection intervals that are multiples of 1.25 milliseconds (ms) with a minimum value of 7.5 ms for connection intervals for the Bluetooth low energy (BLE) technology. Within each 1.25 ms connection interval window, there are two 625 microsecond (μs) data transfer windows available. Both master and slave clocks 105, 115 remain tightly synchronized, such as within approximately +/−10 μs, in order to successfully transmit and receive data within the data transfer windows. In this example, the slave radio 114 maintains the clock frequency offset for each connection interval in the register 116 and uses the clock frequency offset to keep the data windows of each connection interval synchronized.

In realtime or at a later time, a data fusing mechanism operative on either the CPU 103 of the master device 101 or the CPU 113 of the slave device 111 can use the clock frequency offset for each respective data transfer window to scale the corresponding timestamps (matched to a respective connection interval and corresponding clock frequency offset) by an appropriate percentage to compensate for frequency drift between the first clock 105 and the second clock 115. The timestamps are applied to sensor data from the sensor 112 of the slave device 111. In this way, using the clock frequency offset from the register 116 by either the master device 101 or the slave device 111 to scale timestamps thereby yields more tightly synchronized data from the second sensor 112. When there is a need to combine timestamped data from the first sensor 102 with time-stamped data from the second sensor 112, timestamps based on the first clock 105 for data from the first sensor 102 more accurately can be combined with timestamps based on the second clock 115 for data from the second sensor 112 because a clock frequency (clock drift) correction is applied to the timestamps from the slave device 111 based on the clock frequency offsets. Generally, according to some embodiments, only one of the devices 101, 111 needs to have and use a sensor in order for the other device to obtain timestamped data from that sensor with improved timestamp accuracy by using the technique described. In one specific embodiment, the master device 101 does not have a master sensor 102, or does not use its master sensor 102, when generating scaled timestamps for data generated from the slave sensor 112 and timestamped initially based on the slave clock 115.

In reference to FIG. 1, as a third example of an embodiment, a Bluetooth stack at the slave device 111 is configured to generate an event at the beginning or at the end of each connection interval. For any protocol, as illustrated by this Bluetooth example, connection interval durations are known ahead of time and both the master radio 104 and the slave radio 114 maintain synchronized radio timings or radio clocks to maintain a connection via the physical layer protocol 107. Thus, time measured between connection interval events ("events" or "wireless connection interval events") at the slave device 111 is equal to the connection interval as determined by the master clock 105. In general, an elapsed time between events is visible to both the master device 101 and the slave device 111, and an expected time between the events is known relative to either the first (internal) clock 105 or the second (internal) clock 115. In this embodiment, the expected time between events is based on the master's clock. By measuring the time elapsed on the slave clock 115 between events, it is possible to determine how much time elapses on the slave clock 115 over a connection interval, and thus it is possible to determine a difference in clock rate between the slave clock 115 and the master clock 105. For example, if the slave device 111 measures 600 μs between successive connection interval events but it is known that the master device 101 is configured for 625 μs between the same successive connection interval events, it is possible to determine that the slave clock 115 is approximately (25/625) μs or 4% slower than the master clock 105 over that connection interval. This process for determining a percentage offset can be repeated at each connection interval or at some pre-determined interval as often as a timing event is triggered or as often as a timing event occurs between the master device 101 and the slave device 111.

As would be understood to those of ordinary skill in the art, in FIG. 1, certain components of the master device 101 and the slave device 111 are omitted for sake of clarity in illustration. For example, each of the master device 101 and the slave device 111 have a power supply, a data bus over which various components communicate with each other, a chassis, an antenna, a memory, and an operating system operative in the memory to control the CPUs 103, 113 and other components of the respective devices 101, 111.

Figure 2:
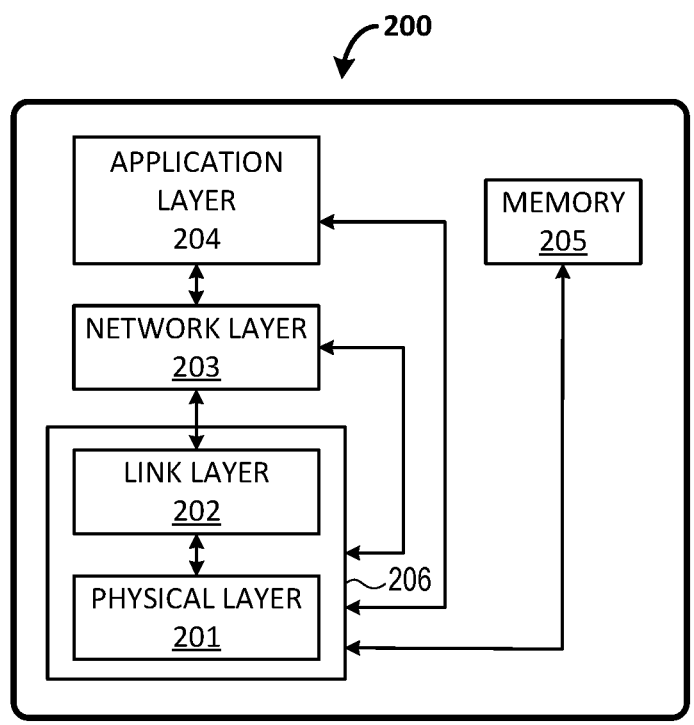
FIG. 2 is a block diagram of a protocol stack for improved time synchronization of sensor data in accordance with some embodiments.

FIG. 2 is a block diagram of a protocol stack for improved time synchronization of sensor data in accordance with some embodiments. In FIG. 2, a protocol stack 200 is operative in devices that synchronize their respective sensor data such as in the master device 101 and the slave device 111 of FIG. 1 and other example embodiments described herein. In FIG. 2, the protocol stack 200 includes a physical layer 201 that generates a bit stream that may include data grouped into code words or symbols. The physical layer 201 converts the bit stream of a device into a physical signal and transmits the signal to a receiver such as a physical layer of another device. The physical layer 201 provides an electrical, mechanical, and procedural interface to other devices. Multiple types of the physical layer 201 are available for use. The physical layer 201 may be arranged to communicate with or relay information to a network layer 203 and/or an application layer 204 instead of through a conventional arrangement that includes being bound to communicate with a link layer 202, then with a network layer 203, and finally with an application in an application layer 204. According to some embodiments, the physical layer 201 is configured to communicate with one or more memory structures (e.g., cells, tables, fields) of a memory 205 that are directly accessible to higher layers such as the network layer 203 and the application layer 204.

The protocol stack 200 also includes the link layer 202 that communicates with the lowest level layer, the physical layer 201. The link layer 202 may include a media access control (MAC) sublayer or component that provides addressing and channel access control mechanisms that make it possible for other layers 203, 204 to communicate with the physical layer 201. The link layer 202 may support a MAC protocol for interacting with other components of a device and other components of the protocol stack 200. The link layer 202 and the physical layer 201 may be bound together as a controller or with a controller 206. The link layer 202 is responsible for identifying and encapsulating network layer protocols, providing error checking, and ensuring frame synchronization. The link layer 202 may be configured to communicate with cells of a memory 205 that are accessible to higher layers such as the application layer 204 and the network layer 203.

The protocol stack 200 includes a network layer 203 that manages addressing, routing, and traffic control to components in the physical layer 201. Latency can be introduced to conventional sensor data synchronization by isolating the physical layer 201 and the link layer 202 from applications of the application layer 204. However, as described above in relation to FIG. 1 and further herein in relation to other figures, applications operating at the application layer 204 are configured to directly access information, data, data structures, attributes, profiles, and the like of the physical layer 201 and the link layer 202 depending on which physical, firmware-based and software-based technology is available to the applications. The protocol stack 200 is not specific to any particular technology but provides a basis for implementing the techniques described herein with any one of a variety of device architectures, communication protocols, and standards. One skilled in the art can readily recognize that while the Bluetooth wireless protocol or other protocol is described as examples of embodiments, the techniques and components described herein are applicable to any wireless or wired protocol that requires clock synchronization between communicating devices. Examples of such other protocols include Gazell, code division multiple access (CDMA), global system for mobiles (GSM), and time division multiple access (TDMA), and ANT.

Figure 3:
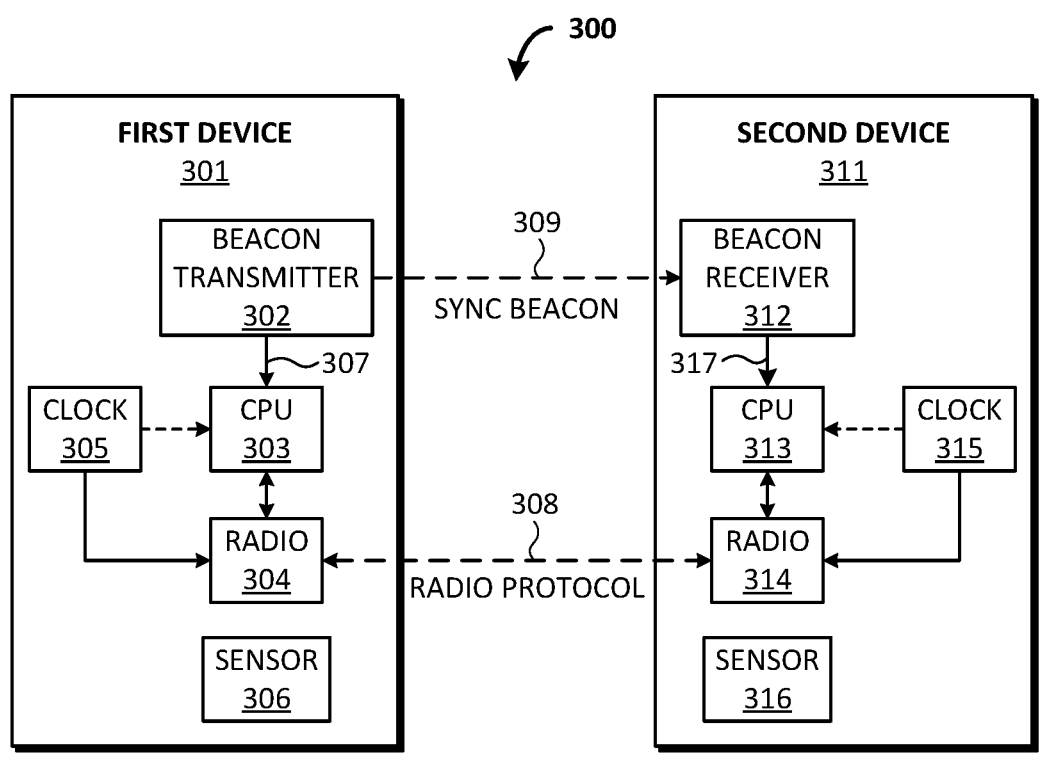
FIG. 3 is a block diagram of a system for improved time synchronization of sensor data in accordance with some embodiments.

FIG. 3 is a block diagram of a system for improved time synchronization of sensor data in accordance with another embodiment using clock rate synchronization to correct clock drift. In FIG. 3, a system 300 includes a first device 301 that communicates with a second device 311. The first device 301 includes a beacon transmitter (Tx) 302, a processor such as CPU 303, a radio 304, a first clock 305, and a first sensor 306. The second device 311 includes a beacon receiver (Rx) 312, a processor such as CPU 313, a radio 314, a second clock 315, and a second sensor 316. According to some embodiments, the CPUs 303, 313 operate in synchrony with the operation of the first clock 305 and the second clock 315, respectively.

In FIG. 3, the first device 301 transmits, using the beacon transmitter 302, a beacon signal which consists of two pulses with a known amount of elapsed time (relative to the first device's clock 305) between the pulses. At the second device 311, the time between the two beacon pulses is measured relative to the second device's clock 315, and the difference between the known elapsed time and the measured elapsed time is used to compute the clock frequency offset, and one of a plurality of aforementioned methods of adjusting timestamps based on the second clock 315 to match a rate of the first clock 305 can be used.

In one embodiment, the beacon is sent via a MAC-level (link layer) message from the first radio 304 to the second radio 314. Because MAC-level messages are very close to a hardware layer, MAC-level messages do not suffer from the same latencies that are incurred when sending application layer messages, and thus the latency between sending and receiving is minimal. As a result, beacons sent over MAC-level messages can provide sufficient accuracy to provide the desired level of synchronization. In the present embodiment, a separate beacon transmitter 302 and beacon receiver 312 are not required since the beacon can be sent over the radios 304 and 314.

In other embodiments, the beacon 309 is sent using the beacon transmitter 302 and receiver 312. In one embodiment of FIG. 3, the beacon transmitter 302 is an EM transmitter (Tx) that transmits electromagnetic signals using magnetic waves or radiated electrical waves. The beacon receiver 312 is an EM receiver (Rx) that receives each sync beacon 309.

Emission of the sync beacon 309 by the EM Tx 302 and reception of the sync beacon 309 by the EM Rx 312 may be a periodic event. While an EM type of sync beacon 309 is described, according to other embodiments, the sync beacon 309 may be sent using a light strobe, sonic waves, or ultrasonic waves. The transmitter/receiver pair would then be matched to the type of sync beacon 309 used to signal the respective devices 301, 311.

In FIG. 3, sensor data samples may be timestamped at one of the devices 301, 311 at known fixed intervals. Typically, data that are captured at a sensor 306, 316 are provided to a respective CPU 303, 313 at fixed intervals based on the respective hardware clocks 305, 315. An interrupt 307, 317 on the CPU 303, 313 is triggered and the data are collected, and then optionally aggregated with other generated data on one device by transmitting the sensor data of one device to the other device. For example, the data from the second device 311 is transmitted to the first device 301. Timestamps from the second device 311 may be transmitted contemporaneously with the sensor data. According to other embodiments, a time indicator may be transmitted from the second device 311 to the first device 301, and then the first device 301 computes highly accurate timestamps for the second sensor data at the first device 301 based on the time indicator from which is derived the time correction. According to some embodiments, data from the second device 311 is transferred via the radio protocol 308. When the timestamp for the data is generated at the interrupt 307, 317, there is some variability in the timestamp. Typically, this variability is on the order of tens of microseconds due to interrupt latency. Rather than incurring interrupt latency, the timestamp for the data samples can be computed by adding a fixed time interval to a previous timestamp. This method removes interrupt latency, and this additional technique can be combined with one or more of the techniques described herein to produce more accurate timestamps that are subsequently synchronized to a respective time reference based on one of the clocks 305, 315.

Figure 4:
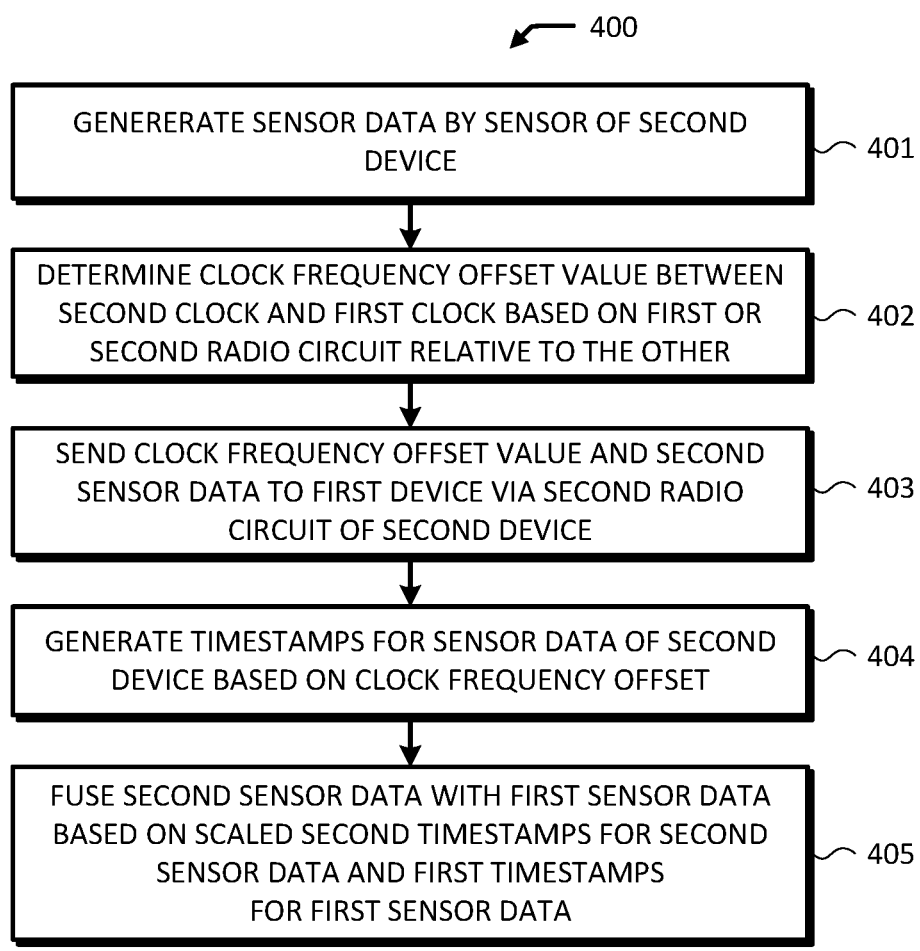
FIG. 4 is a flowchart of a method for improved time synchronization of sensor data in accordance with some embodiments.

FIG. 4 is a flowchart of a method 400 for improved time synchronization of sensor data in accordance with some embodiments. The method 400 includes various operations. Operation 401 includes generating sensor data with a second sensor of a second device. Operation 402 includes determining a clock frequency offset value between the second clock of the second device and the first clock of the first device. For example, operation 402 includes accessing a register in memory that stores a clock frequency offset between the first clock and the second clock for a connection interval of a connection at a physical layer between the first device and the second device. In general, operation 403 involves use of a physical layer aspect that facilitates a more rapid and more accurate determination of timestamps of a first device relative to a second device. The physical layer aspect may take the form of a signal, a value, a condition, or a mechanism that is detected or directly used for determining an offset or a basis for scaling of timestamps, data, or timestamps and data.

Operation 403 includes sending the clock frequency offset value and the second sensor data to the first device via a second radio circuit of the second device. As an example, the second radio circuit communicates at a physical layer with a first radio circuit of the first device. Operation 404 includes generating timestamps for the sensor data of the second device based on the clock frequency offset. According to an alternative embodiment, if timestamps are already generated for the sensor data of the second device, operation 404 includes scaling of the second timestamps for the second sensor data based on the clock frequency offset value to generate synchronized timestamps for the second sensor data. In general, synchronized timestamps are based on a clock and a correction based on the clock frequency offset value or a rate of drift determined in the system. Operation 405 includes using the sensor data of the second device based on the synchronized timestamps. According to some embodiments, using second sensor data includes combining, merging, or fusing of the second sensor data based on the synchronized timestamps. By way of example, first sensor data from a first sensor of a first device can be fused or combined with the second sensor data in time order based on first timestamps for the first sensor data, the first timestamps being based on a first clock of the first device, and the scaled second timestamps or synchronized timestamps being initially based on a second clock of the second device. Fusing of sensor data includes at least combining sensor data in chronological order based on timestamps associated with respective sensor values. In this way, clock frequency drift between two devices is at least partially corrected.

The method optionally includes other operations. For example, the method 400 optionally includes providing a time offset to scaled second timestamps to account for any time delay or starting time difference between the first clock and the second clock. The method 400 also optionally includes generating a pose of the second device relative to the first device. The method 400 may include having the first device and first radio circuit operate in a master mode relative to the second device and the second radio circuit operating in a slave mode relative to the first device.

Figure 5:
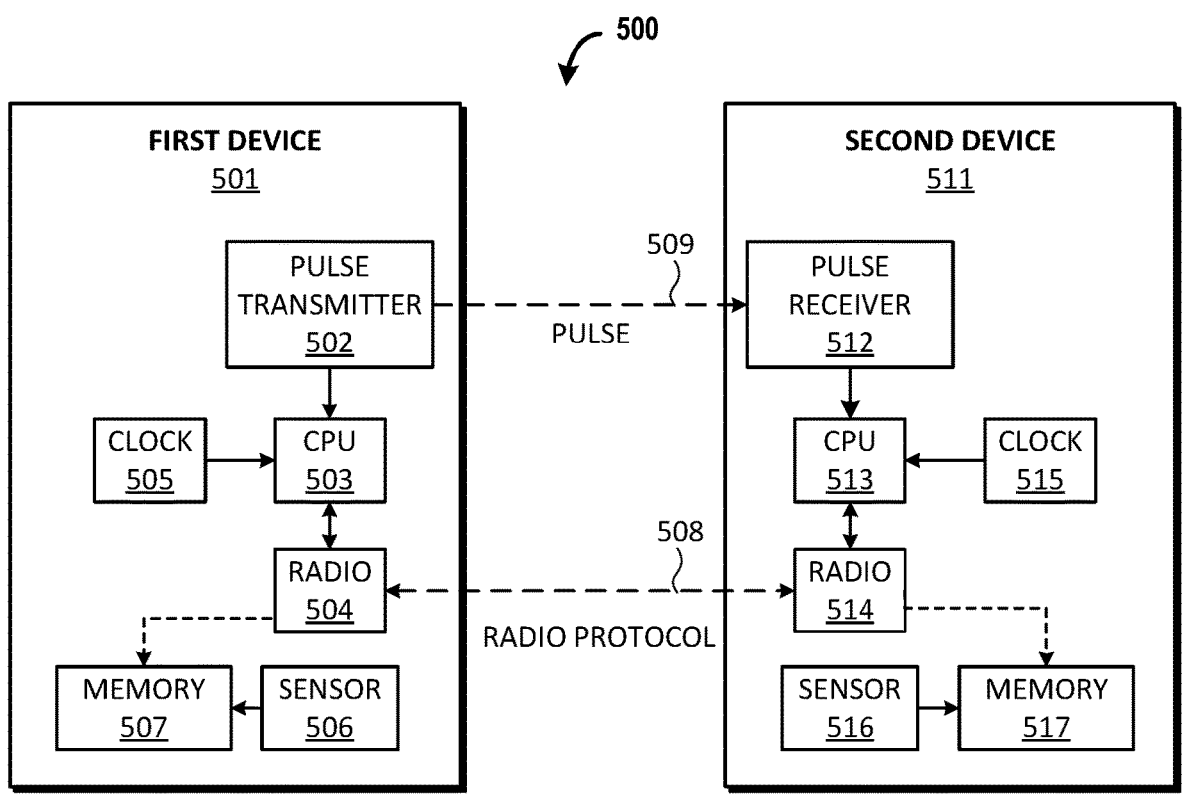
FIG. 5 is a block diagram of a system for improved time synchronization of sensor data in accordance with some embodiments.

FIG. 5 is a block diagram of a system 500 for correcting for a time offset error between two clocks of two respective devices. The system 500 improves time synchronization of sensor data in accordance with another embodiment. An offset error can increase over time as two devices with different clocks operate at two different frequencies. Even two identical devices having identical components can drift apart over time based on a variability between temperature of the two devices, resulting in a time offset between the two clocks. According to conventional methods, to correct for a clock offset error between two devices, a clock reference value is sent from a first device to a second device, or vice versa, in order to synchronize the clocks. However, sending of such a message incurs a variable amount of delay when being sent at the application protocol level such as at the application layer 204 in FIG. 2 which can result in inaccurate synchronization and inaccurate time offset error correction.

The system 500 of FIG. 5 improves upon conventional schemes for clock offset error correction. The system 500 includes a first device 501 that communicates with a second device 511. The first device 501 includes a pulse transmitter 502, a processor such as CPU 503, a radio 504, a first clock 505, and a memory 507. The first device 501 optionally includes a sensor 506 when first data from the first sensor 506 are combined with other data. The second device 511 includes a pulse receiver 512, a processor such as CPU 513, a radio 514, a second clock 515, a sensor 516, and a memory 517.

To get around conventional synchronization drawbacks, a synchronization pulse is used. The first device 501 sends a sync pulse 509 via the pulse transmitter 502 at a known time on the first clock 505. The pulse 509 is transmitted using either a low-latency mechanism, or a mechanism where the latency is deterministic (that is, a deterministic latency mechanism) and thereby can be confidently accounted for. In either case, the unknown portion of the latency between the sending and receiving of the pulse is smaller than a desired time sync accuracy. All data timestamps on the second device 511 are generated relative to the time the second device 511 receives the pulse at the pulse receiver 512. The timestamps generated at the second device 511 are referred to as relative timestamps. When timestamped sensor data generated by the second sensor 516 are sent to the first device 501 from the second device 511 over a wireless protocol via the radios 504, 514, the first device 501 can generate synchronized or corrected timestamps for the second device sensor data by adding each relative timestamp to the time of the pulse 509 based on the first clock 505 of the first device 501. The communication between the radios 504, 514 is represented by the signal 508 in FIG. 5.

In addition to clock offset, the first device 501 and second device 511 can still account for clock drift between the clocks by employing one of the aforementioned techniques for clock frequency synchronization. One skilled in the art could readily understand how the same pulse-based synchronization can be achieved whether the pulse is transmitted from the first device 501 or transmitted from the second device 511.

In FIG. 5, according to some embodiments, the pulse 509 is sent one time between devices 501, 511. According to other embodiments, the pulse 509 is sent multiple times. According to some embodiments, the pulse 509 is a beacon sent at a known interval. A base time reference for the sensor data timestamps on the respective devices 501, 511 may be reset whenever a pulse 509 is sent. In the case where the pulse is periodic, the pulse interval is selected to be much longer than the expected latency of any messages being sent over the wireless protocol by way of the signal 508 to remove ambiguity about which pulse the timestamps of the receiving device are relative to. For example, if sensor data were sampled by the sensor 516 at the second device 511 at a rate of 1,000 samples per second, a one second pulse interval would confidently remove ambiguity about which pulse the relative timestamp is based off of.

In the general case, the clocks 505, 515 of the first device 501 and the second device 511 do not share a same starting point when first brought together to exchange data. However, when the first device 501 and the second device 511 have a same starting point, the offset can be accounted for. The offset can change over time, and thus a correction can be implemented periodically. For example, if there initially is a one second time difference between the first clock 505 and the second clock 515 in terms of actual calendar time, removing the drift between the clocks 505, 515 keeps them at the one second time differential without experiencing a time offset drift. The one second differential can be accounted for later by adjusting timestamps by the known one second difference. However, in some cases, it is desirable for timestamps for data from sensors 506, 516 to be kept in sync with a zero or an approximately zero offset. In the system 500, a clock time offset error is adjusted at either the first device 501 or the second device 511 so that the offset of the first clock 505 is minimized in relation to the second clock 515 of the second device 511. In short, the process for time offset error correction includes sending a pulse, and making an update to timestamps generated based on the respective first clock 505 and the second clock 515 of the two devices 501, 511.

In some embodiments, the pulse transmitter 502 and pulse receiver 512 are not used for sending and receiving the pulse 509. Instead, the pulse is sent using the radios 504, 514 using a MAC-level protocol message sent at a link layer protocol level such as at link layer 202 of FIG. 2 thereby avoiding the inherent latencies incurred for messages sent at an application level between the devices 501, 511. For example, a MAC-level Bluetooth broadcast message is used to deliver the pulse between the radios 504, 514. One skilled in the art would know how this method can be applied to any wireless protocol or technology that allows for a regular transmission with known delays that are smaller than a desired time synchronization accuracy.

Figure 6:
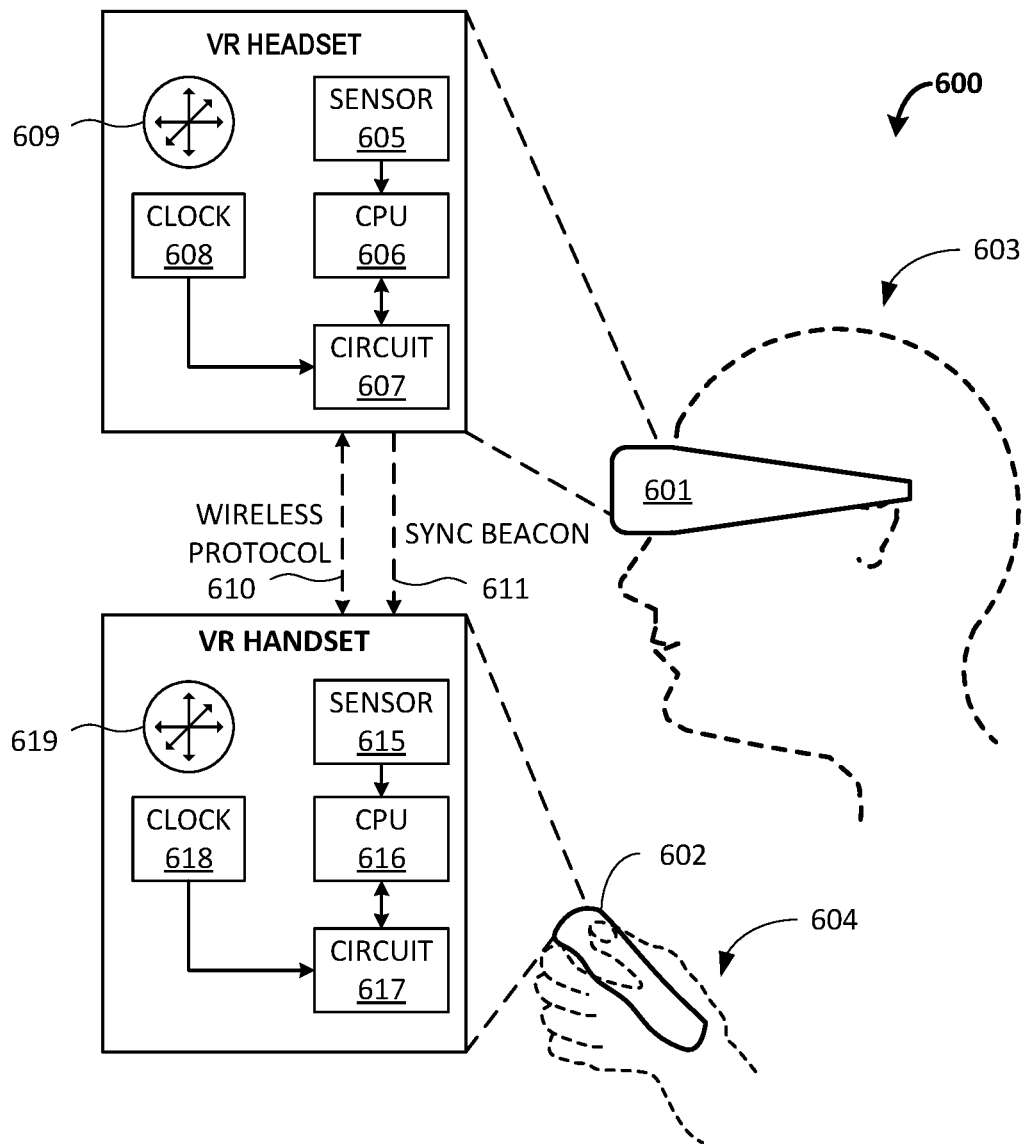
FIG. 6 is a diagram of a headset and a handset as devices for use in virtual reality applications in accordance with some embodiments.

FIG. 6 is a diagram of a headset and a handset as devices for use in virtual reality applications in accordance with some embodiments. In FIG. 6, a system 600 includes a VR headset 601 for use on a head 603 of a user and a VR handset 602 such as a VR controller for use in a hand 604 of the user. The VR headset 601 is an example of a first device or second device as described herein in relation to other figures. The VR handset 602 is an example of a first device or second device as described herein in relation to other figures. The VR headset 601 includes a sensor 605, a processor such as CPU 606 or a graphics processor unit (GPU), a wireless circuit 607, a first clock 608, and an electromechanical component 609 such as one or more of a magnetometer, an accelerometer, and a gyroscope, for determining a pose of the VR headset 601. The sensor 605 may be an electromechanical component such as the electromechanical component 609. In some embodiments, only one of the sensor 605 and the electromechanical component 609 is needed and used for improved synchronization and pose creation.

According to some embodiments, the VR handset 602 includes a sensor 615, a processor such as CPU 816 or a GPU, a wireless circuit 617, a second clock 618, and an electromechanical component 619 for determining a pose of the VR handset 802. The sensor 615 of the handset 602 may be an electromechanical component such as the electromechanical component 619. In some embodiments, only one of the sensor 615 and the electromechanical component 619 is needed and used for improved synchronization and pose creation.

In FIG. 6, the VR headset 601 communicates with the VR handset 602 via one or more wireless protocols 610. One or more of the VR headset 601 and the VR handset 602 may provide one or more pulses or sync beacons 611 to the other. One or more of the VR headset 601 and the VR handset 602 stores or records a first start time based on its clock 608, 618. In some embodiments, the other device stores or records a second start time at its clock 618, 608. A start time can include a timestamp such as a timestamp cued off of a pulse sent between the VR headset 601 and the VR handset 602.

When in a communication session, the VR headset 601 generates sensor data via its sensor 605, and the VR handset 602 generates sensor data via its sensor 615. During the communication session, the VR handset 602 communicates its sensor data 615, handset timestamps for the sensor data based on its (second) clock 618, and one or more clock frequency offset values, to the VR headset 601 according to some embodiments. The VR headset 601 then uses the sensor data from the VR handset 602. According to one example, the VR headset 601 combines sensor data from the VR handset 602 with its own sensor data and its own timestamps based on the first clock 608. When combining the sensor data from the two devices 601, 602, the VR headset 601 uses the one or more clock frequency offset values to generate corrected timestamp values for the data from the VR handset 602 to compensate for a difference between the rate of advancement of the two clocks 608, 618. Optionally, the VR headset 601 may scale the data from the second sensor 615 based on a clock frequency offset received from the VR handset 602. In this way, more accurate timestamps and more accurate sensor data are possible, and thereby more accurate poses of the devices 601, 602 relative to each other are possible. The increased accuracy is especially useful in VR applications such as the one illustrated in FIG. 6 where tight time and data synchronizations are desired.

Depending on design decisions, a same or a different component of the VR handset 602 may perform each respective step of the data generation, data communication, data scaling, data combining, timestamp generation, and timestamp manipulation functions in the system illustrated in FIG. 6. Similarly, a same or a different component of the VR headset 601 may perform each respective step of the functions performed on the VR headset 601.

Conclusion. In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A position tracking system comprising:
   a first device including:
      a first clock operating at a clock rate different from a second clock of a second device;
      a first wireless circuit configured to communicate at a physical layer with a second wireless circuit of the second device; and
   one or more processors configured to execute instructions to:
      determine a clock frequency offset value between the first clock of the first device and a second clock of the second device using:
         an elapsed time between events visible to both the first and second device based on the second clock, wherein each of the events is issued by the first device in a form of a beacon sent wirelessly between a first media access control layer of the first device and a second media access control layer of the second device, wherein the beacon includes a first pulse that denotes a start of a wireless connection interval and a second pulse that denotes an end of the wireless connection interval; and
         an expected time relative to the first clock between the first pulse and the second pulse;
      determine a rate of drift between the first clock and the second clock, wherein the rate of drift is based on a ratio between the elapsed time and the expected time between the events;
      receive sensor data generated by a sensor of the second device;
      generate synchronized timestamps, by scaling timestamps of the sensor data, for the received sensor data based on the second clock with a correction based on the clock frequency offset value and the rate of drift; and
      compute a pose for one of: the first device or the second device.

2. The position tracking system of claim 1, wherein a timestamp for a sample of sensor data is generated by adding a value to the timestamp of a previous sample of sensor data.

3. The position tracking system of claim 1, wherein the one or more processors are further configured to execute instructions to:
read the clock frequency offset value from a register associated with the second wireless circuit.

4. The position tracking system of claim 1, wherein the events are derived from a physical layer of a wireless protocol active between the first wireless circuit and the second wireless circuit.

5. The position tracking system of claim 1, wherein the events are wireless connection interval events during the wireless connection interval.

6. The position tracking system of claim 1, wherein the beacon is transmitted between the first and the second device using one of:
a message over a wireless communication channel on a network layer below an application layer;
an electromagnetic signal;
an optical signal;
a sonic or ultrasonic signal;
a radiated electrical signal; and
a periodic signal over time with a pre-determined period.

7. A system for reducing time offset error in sensor data timestamps, the system comprising:
a first device having a first clock, the first device configured to:
receive a first pulse of a beacon signal issued by the first device, wherein the beacon signal is sent wirelessly between a first media access control layer of the first device and a second media access control layer of a second device;
receive a second pulse of the beacon signal, wherein the second pulse is issued an expected time after the first pulse; and
record a first start time, wherein the first start time includes a timestamp of the first pulse based off of the first clock;
the second device having a second clock and a sensor, the second device configured to:
receive the first pulse and the second pulse, wherein the first pulse denotes a start of a wireless connection interval between the first device and the second device and the second pulse denotes an end of the wireless connection interval;
record a second start time based on receiving the first pulse, wherein the second start time includes a timestamp based on the second clock;
receive sensor data generated by the sensor; and
generate relative timestamps that are relative to the second start time for the sensor data based on a rate of drift between the first clock and the second clock, wherein the rate of drift is based on a ratio between an elapsed time and the expected time between the first pulse and the second pulse for the relative timestamps, wherein the expected time is relative to the first clock, and wherein the relative timestamps are scaled based on the rate of drift; and
one or more processors configured to:
compute corrected timestamps for the sensor data by combining the first start time with the relative timestamps; and
compute a pose for one of: the first device or the second device.

8. The system of claim 7, wherein a timestamp for a sample of sensor data is generated by adding a value, based on the rate of drift, to the timestamp of a previous sample.

9. The system of claim 7, wherein each of the first and second pulses is transmitted using at least one of:
an electromagnetic signal;
an optical signal;
a sonic signal;
an ultrasonic signal; and
a radiated electrical signal.

10. A method for reducing drift in sensor data timestamps for a position tracking system, the method comprising:
determining a clock frequency offset value between a first clock of a first device and a second clock of a second device by:
measuring, with the second clock, an elapsed time between events visible to both the first and second device, wherein the events are in a form of a beacon signal sent wirelessly between a first media access control layer of the first device and a second media access control layer of the second device, and wherein a first pulse of the beacon signal denotes a start of a wireless connection interval across a wireless communication link between the first device and the second device and a second pulse of the beacon signal denotes an end of the wireless connection interval at an expected time after the first pulse relative to either the first clock or the second clock, and wherein the first and second pulses are sent between a first wireless circuit of the first device and a second wireless circuit of the second device; and
computing a rate of drift between the first clock and the second clock, wherein the rate of drift is based on a ratio between the elapsed time and the expected time between the events;
receiving sensor data generated by a sensor of the second device;
generating synchronized timestamps for the sensor data based on one or both of the first clock and the second clock with a correction based on the clock frequency offset value and the rate of drift; and
computing, on a processor, a pose for one of: the first device or the second device.

11. The method of claim 10, wherein a timestamp for a sample of sensor data is generated by adding a value, based on the rate of drift, to the timestamp of a previous sample of sensor data.

12. The method of claim 10, wherein determining the clock frequency offset value includes:
reading the clock frequency offset value from a register associated with the second wireless circuit.

13. The method of claim 10, wherein the events are one of:
events derived from a physical layer of a wireless physical layer protocol active between the first wireless circuit and the second wireless circuit; and
wireless connection interval events.

14. The method of claim 10, wherein:
the beacon signal is a message sent over a wireless communication channel at a network layer below an application layer, between the first wireless circuit and the second wireless circuit.

15. The method of claim 10, wherein:
the beacon signal is transmitted between the first device and the second device via at least one of:
an electromagnetic signal;
a light signal;

a sonic signal;
an ultrasonic signal;
a radiated electrical signal; and
a signal having a fixed period, the signal continuously sent over time.

16. A method for reducing time offset error in sensor data timestamps for a position tracking system, the method comprising:
- issuing a first pulse of a beacon signal by a first device as a start of a wireless connection interval for time offset error correction, wherein the beacon signal is sent wirelessly between a first media access control layer of the first device and a second media access control layer of a second device;
- issuing a second pulse by one of the first device and the second device as an end of the wireless connection interval;
- receiving, by the other of the first or the second device, the first pulse and the second pulse;
- recording a first start time, wherein the first start time includes a timestamp of the first pulse based off of a first clock of the first device;
- recording, by the second device, a second start time, wherein the second start time includes a timestamp of the first pulse based on a second clock of the second device;
- measuring, based on the second clock, an elapsed time between the issued first pulse and the received first pulse; and
- computing a rate of drift between the first clock and the second clock, wherein the rate of drift is based on a ratio between the elapsed time and an expected time between the first pulse and the second pulse, and wherein the expected time is relative to the first clock;
- receiving sensor data generated by a sensor of the second device;
- generating relative timestamps that are relative to the second start time for the sensor data based on the second clock and the rate of drift between the first clock and the second clock;
- computing corrected timestamps for the sensor data by combining the first start time with the relative timestamps; and
- computing, on a processor, a pose for one of: the first device or the second device.

17. The method of claim 16, wherein a timestamp for a sample of sensor data is generated by adding a value to the timestamp of a previous sample of sensor data.

18. The method of claim 16, where the first pulse is sent over a wireless communication link between the first device and the second device using a network layer below an application layer.

19. The method of claim 16, where the each of the first pulse and the second pulse is transmitted between the first device and the second device using at least one of:
an electromagnetic signal;
a light signal;
a sonic signal;
an ultrasonic signal;
a radiated electrical signal; and
a signal having a fixed period, the signal continuously sent over time.

20. The position tracking system of claim 1, wherein the clock frequency offset value and the rate of drift are determined during each connection interval between the first wireless circuit of the first device and the second wireless circuit of the second device.

21. The position tracking system of claim 1, wherein the expected time between the first pulse and the second pulse is a known fixed interval of a physical layer protocol.

22. The position tracking system of claim 21, wherein the known fixed interval is within a connection interval window of the physical layer protocol.

23. The position tracking system of claim 1, wherein each wireless connection interval includes at least one connection interval window for wireless data transfer between the first device and the second device.

* * * * *